(12) United States Patent
Atherton et al.

(10) Patent No.: US 12,541,712 B2
(45) Date of Patent: Feb. 3, 2026

(54) MACHINE LEARNING TECHNIQUES FOR GENERATING INVERSE KINEMATIC MODELS FOR CHARACTER ANIMATION

(71) Applicant: AUTODESK, INC., San Francisco, CA (US)

(72) Inventors: Evan Patrick Atherton, Castro Valley, CA (US); Dieu Linh Tran, London (GB)

(73) Assignee: AUTODESK, INC., San Francisco, CA (US)

( * ) Notice: Subject to any disclaimer, the term of this patent is extended or adjusted under 35 U.S.C. 154(b) by 450 days.

(21) Appl. No.: 17/822,106

(22) Filed: Aug. 24, 2022

(65) Prior Publication Data

US 2024/0070517 A1    Feb. 29, 2024

(51) Int. Cl.
*G06T 17/20* (2006.01)
*G06N 20/00* (2019.01)
*G06T 15/10* (2011.01)

(52) U.S. Cl.
CPC ............. *G06N 20/00* (2019.01); *G06T 15/10* (2013.01); *G06T 17/20* (2013.01)

(58) Field of Classification Search
CPC .......... G06N 20/00; G06N 3/084; G06N 3/09; G06T 13/40; G06T 15/00; G06T 17/20
See application file for complete search history.

(56) References Cited

U.S. PATENT DOCUMENTS

| 10,546,408 B2* | 1/2020 | Yang | G06N 3/045 |
| 2016/0335486 A1* | 11/2016 | Fleishman | G06F 18/24323 |
| 2016/0335790 A1* | 11/2016 | Fleishman | G06T 7/143 |
| 2019/0295305 A1* | 9/2019 | Yang | G06N 3/044 |
| 2021/0312689 A1* | 10/2021 | Akhoundi | G06N 20/00 |

(Continued)

FOREIGN PATENT DOCUMENTS

WO    WO-2020173816 A1 *    9/2020    ............. G06N 3/082

OTHER PUBLICATIONS

Bailey et al., "Fast and Deep Deformation Approximations", ACM Transactions on Graphics, vol. 37, Issue 4, Aug. 2018, Article No. 119, pp. 1-12, https://doi.org/10.1145/3197517.3201300, 12 pages.

(Continued)

*Primary Examiner* — Tsung Yin Tsai
(74) *Attorney, Agent, or Firm* — Artegis Law Group, LLP

(57) ABSTRACT

In various embodiments, an inverse kinematic (IK) modeling application generates models that are used to solve IK problems for object animations. The IK modeling application generates configuration vectors based on a set of joint parameters associated with a joint chain. The IK modeling application executes forward kinematic operation(s) on the joint chain based on the configuration vectors to generate target vectors. Each target vector includes data associated with at least one of a position or an orientation for an end-effector associated with the joint chain. The IK modeling application performs one or more machine learning (ML) operations on an ML model based on the configuration vectors and the target vectors to generate a trained ML model that computes a predicted joint vector associated with the joint chain based on at least one of a target position or a target orientation for the end-effector.

18 Claims, 4 Drawing Sheets

(56) References Cited

U.S. PATENT DOCUMENTS

2022/0142712 A1* 5/2022 Toporek .................. G06T 7/246
2023/0368451 A1 11/2023 Bocquelet et al.
2024/0054671 A1* 2/2024 Oreshkin ............... G06V 10/44

OTHER PUBLICATIONS

Xu et al., "RigNet: Neural Rigging for Articulated Characters", SIGGRAPH 2020, https://zhan-xu.github.io/rig-net/, 3 pages.
Non Final Office Action received for U.S. Appl. No. 17/822,108 dated Apr. 22, 2024, 19 pages.
Csiszar et al., "On Solving the Inverse Kinematics Problem using Neural Networks", 24th International Conference on Mechatronics and Machine Vision in Practice, 2017, 6 pages.
Final Office Action received for U.S. Appl. No. 17/822,108 dated Aug. 14, 2024, 16 pages.
Non Final Office Action received for U.S. Appl. No. 17/822,108 dated Jan. 27, 2025, 16 pages.
Final Office Action received for U.S. Appl. No. 17/822,108 dated Jul. 11, 2025, 28 pages.
Notice of Allowance received for U.S. Appl. No. 17/822,108 dated Dec. 22, 2025, 7 pages.

* cited by examiner

MACHINE LEARNING TECHNIQUES FOR GENERATING INVERSE KINEMATIC MODELS FOR CHARACTER ANIMATION

BACKGROUND

Field of the Various Embodiments

The various embodiments relate generally to computer animation and machine learning and, more specifically, to machine learning techniques for generating inverse kinematic models for character animation.

Description of the Related Art

Skeleton animation or "rigging" is a process that is performed via computer animation software to prepare a digital surface representation or "mesh" of an object being animated. In a typical implementation of rigging, a hierarchical set of interconnected and moveable joints, referred to as a "skeleton," is added to a mesh, and any number and/or types of animation controllers are attached to the skeleton to generate a rigged character. The animation controllers describe the behavior of the rigged character in response to different animation inputs. One common type of animation controller is an inverse kinematic solver. A typical inverse kinematic solver computes a configuration for a joint chain that causes an end-point or "end-effector" of the joint chain to reach or come as close as possible to reaching a target and then applies the configuration to the joint chain to move the end-effector to or as close as possible to the target. For example, an inverse kinematic solver for a robotic arm could automatically rotate any number of joints in the robotic arm such that a robotic hand reaches a target six-dimensional (6D) pose (a three-dimensional (3D) position and a 3D orientation).

One approach to generating an inverse kinematic solver for a joint chain is to select and customize a sequence of one or more pre-generated, configurable inverse kinematic solvers that are associated with a computer animation software application, where each pre-generated inverse kinematic solvers implements a different mathematical algorithm to solve a different general class of inverse kinematic problems. For example, a two-link inverse kinematic solver that implements a mathematical algorithm that solves inverse kinematic problems associated with relatively short joint chains of three joints and two connecting links could be selected to animate appendages, such as arms or legs, that are comprised of joints connected by two bones.

One drawback to pre-generated inverse kinematic solvers, though, is that the level of traditional rigging expertise and/or the amount of time required to select and configure a sequence of inverse kinematic solvers to properly animate a complex and/or atypical joint chain can be prohibitive. For example, an inexperienced user could be unable to determine how to modify a sequence of inverse kinematic solvers to prevent various joints from "popping out" at unexpected angles.

Another drawback is that when multiple configurations of a joint chain can achieve the same end-effector target, conventional inverse kinematic solvers determine a single configuration of the joint chain that achieves the end-effector target without taking into account any user preferences. As a result, conventional inverse kinematic solvers oftentimes cannot be configured to account for user-specific goals. For example, a joint chain could be designed with more joints than are necessary to achieve all end-effector targets to enable a rigged character to achieve user-specific goals, such as contorting in an unusually flexible manner to illustrate an abnormal alien anatomy. However, because a conventional inverse kinematic solver determines a single configuration of the joint chain without taking into account any user preferences, the selected configuration is unlikely to illustrate the abnormal alien anatomy.

As the foregoing illustrates, what is needed in the art are more effective techniques for generating inverse kinematic solvers for computer-based animations.

SUMMARY

One embodiment sets forth a computer-implemented method for generating models that are used to solve inverse kinematic problems for object animations. The method includes generating a set of configuration vectors based on a set of joint parameters associated with a joint chain; executing one or more forward kinematic operations on the joint chain based on the set of configuration vectors to generate a set of target vectors, where each target vector included in the set of target vectors includes data associated with at least one of a position or an orientation for an end-effector associated with the joint chain; and performing one or more machine learning operations on a machine learning model based on the set of configuration vectors and the set of target vectors to generate a trained machine learning model that computes a predicted joint vector associated with the joint chain based on at least one of a target position or a target orientation for the end-effector.

At least one technical advantage of the disclosed techniques relative to the prior art is that, with the disclosed techniques, machine learning models of reasonable complexity can be trained to solve inverse kinematic problems for arbitrary joint chains based on automatically generated ground-truth data. Further, because the ground-truth data used to train the machine learning models can be computed automatically using relatively simple kinematic equations, both the level of traditional rigging expertise and the amount of time required to achieve effective inverse kinematic control of a rigged character can be reduced. Another advantage of the disclosed techniques is that, unlike prior art approaches, the parameters of any number of joints in a joint chain can be designated as additional, user-controllable inputs into the machine learning models. Each user-controllable input provides additional user control over a rigged character that would be difficult, if not impossible, to achieve using conventional inverse kinematic solvers. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are denoted with reference numbers identifying the object and parenthetical alphanumeric character(s) identifying the instance where needed.

System Overview

Figure 1:
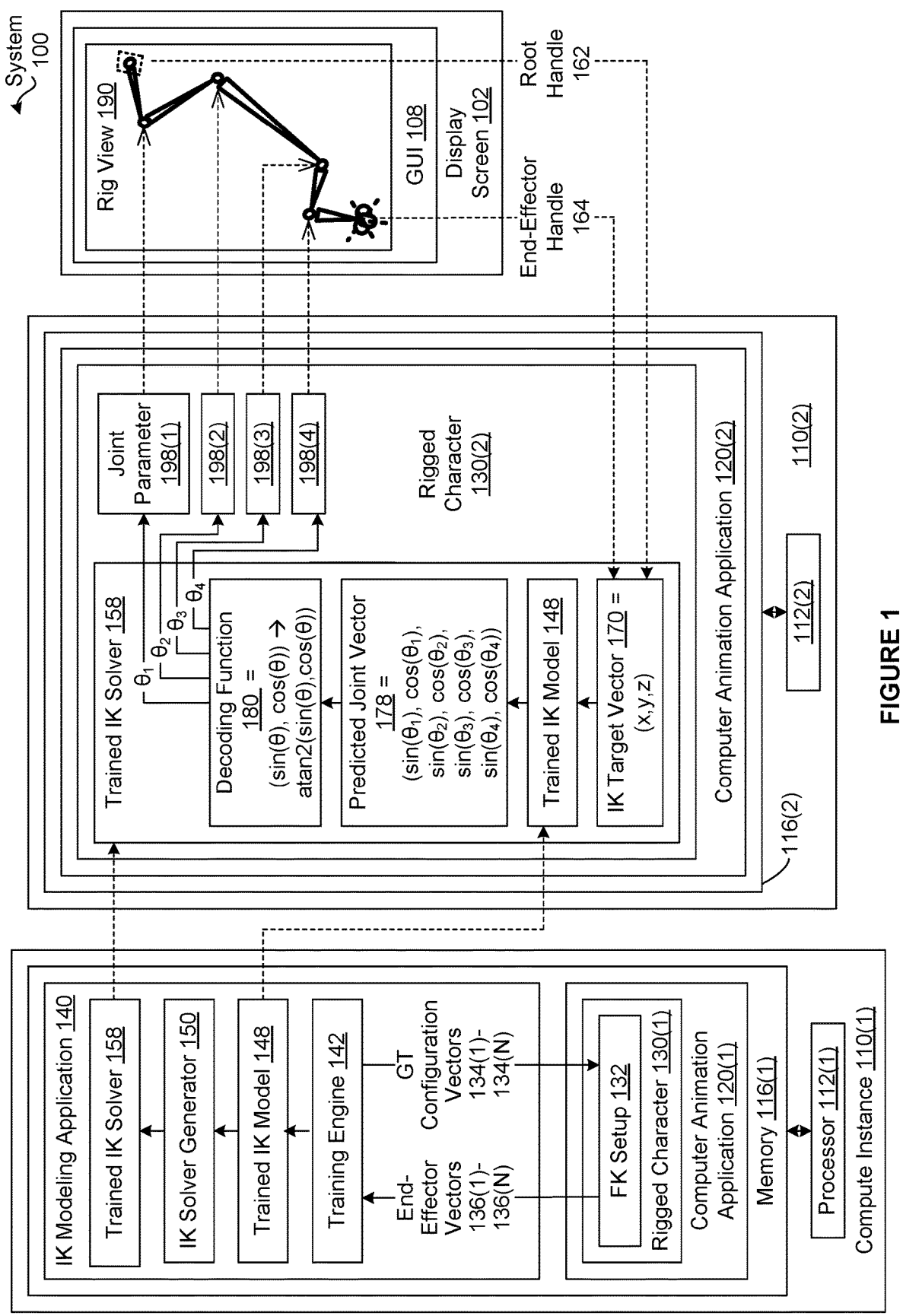
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a compute instance 110(1), a compute instance 110(2), and a display screen 102. In some other embodiments, the compute instance 110(2) and/or the display screen 102 can be omitted from the system 100. In the same or other embodiments, the system 100 can include, without limitation, any number of other compute instances and/or any number of other display screens. In some embodiments, any number of touchscreens can supplement or replace the display screen 102.

Any number of the components of the system 100 can be distributed across multiple geographic locations or implemented in one or more cloud computing environments (e.g., encapsulated shared resources, software, and data) in any combination. In some embodiments, each of the compute instance 110(1), the compute instance 110(2), and zero or more other compute instances can be implemented in a cloud computing environment, implemented as part of any other distributed computing environment, or implemented in a stand-alone fashion.

As shown, the compute instance 110(1) includes, without limitation, a processor 112(1) and a memory 116(1), and the compute instance 110(2) includes, without limitation, a processor 112(2) and a memory 116(2). For explanatory purposes, the compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116."

The processor 112 can be any instruction execution system, apparatus, or device capable of executing instructions. For example, the processor 112 could be a central processing unit, a graphics processing unit, a controller, a microcontroller, a state machine, or any combination thereof. The memory 116 of the compute instance 110 stores content, such as software applications and data, for use by the processor 112 of the compute instance 110. The memory 116 can be one or more of a readily available memory, such as random-access memory, read-only memory, floppy disk, hard disk, or any other form of digital storage, local or remote.

In some other embodiments, each compute instance 110 can include any number of processors 112 and any number of memories 116 in any combination. In particular, any number of compute instances 110 (including one) and/or any number of other compute instances can provide a multiprocessing environment in any technically feasible fashion.

In some embodiments, a storage (not shown) can supplement or replace the memory 116 of the compute instance 110. The storage can include, without limitation, any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

In some embodiments, each compute instance can be connected to zero or more I/O devices (not shown). The I/O devices can include, without limitation, one or more devices configured to receive input, one or more devices configured to provide output, one or more devices configured to both receive input and provide output, or any combination thereof. Some examples of devices that can be configured to receive input include, without limitation, a keyboard, a mouse, and a microphone. Some examples of devices that can be configured to provide output include, without limitation, a display device and a speaker. Some examples of devices that can be configured to both receive input and provide output include, without limitation, a touchscreen and a universal serial bus port.

In some embodiments, each of the compute instance 110(1), the compute instance 110(2), any number of other compute instances, or any combination thereof can be connected to any number and/or types of display devices (not shown). Each display device can be configured to display any amount and/or types of visual content on any number of display screens, any number of touchscreens, or any combination thereof in any technically feasible fashion. As shown, in some embodiments, the compute instance 110(2) is connected to a display device that can be configured to display any amount and/or types of visual content on the display screen 102 in any technically feasible fashion.

In some embodiments, each compute instance 110 can be integrated with any number and/or types of other devices (e.g., one or more other compute instances and/or I/O devices) into a user device. Some examples of user devices include, without limitation, desktop computers, laptops, smartphones, smart televisions, game consoles, and tablets.

In general, each compute instance 110 is configured to implement one or more software applications. For explanatory purposes only, each software application is described as residing in the memory 116 of a single compute instance (e.g., the compute instance 110(1) or the compute instance 110(2)) and executing on the processor 112 of the single compute instances. In some embodiments, any number of instances of any number of software applications can reside in the memory 116 and any number of other memories associated with any number of other compute instances and execute on the processor 112 of the compute instance 110 and any number of other processors associated with any number of other compute instances in any combination. In the same or other embodiments, the functionality of any number of software applications can be distributed across any number of other software applications that reside in the memory 116 and any number of other memories associated with any number of other compute instances and execute on the processor 112 and any number of other processors associated with any number of other compute instances in any combination. Further, subsets of the functionality of multiple software applications can be consolidated into a single software application.

In some embodiments, the compute instance 110(1), the compute instance 110(2), any number of other compute instances, or any combination thereof execute any number of instances of any number and/or types of one or more computer animation applications. In the same or other embodiments, an instance of a computer animation application can generate, modify, display, animate, or any combination thereof, any number of rigged characters based, at least in part, on user input received via any number and/or types of graphical user interfaces (GUIs).

As referred to herein, a "rigged character" includes, without limitation, a skeleton associated with an object, zero or more animation controllers, and optionally a digital surface representation of the object. As also referred to herein, a "rig" includes, without limitation, a skeleton associated with an object and zero or more animation controllers. In some embodiments, a skeleton includes, without limitation, a hierarchical set of interconnected and moveable joints, where each joint is a point of articulation and has at least one degree of freedom. A single joint that is at the highest level of hierarchy of a skeleton is also referred to herein as a "root joint" of the skeleton. In some embodiments, connections between joints are rigid bodies that provide structure to the skeleton and are often referred to and/or visually represented as "bones." In general, the joints cause relative motion between adjacent bones.

In some embodiments, each joint has one or more degrees of freedom, allows certain types of movements, and prohibits other types of movements. Some examples of common types of joints include, without limitation, revolute joints, prismatic joints, and spherical joints. A revolute joint has one degree of freedom and allows a rotation about a common axis between two attached bones. A prismatic joint or "slider" has one degree of freedom and allows a translation along a common axis between two attached bones. As used herein, a "translation" refers to a change in position. A spherical joint has three degrees of freedom, allows a rotation about any axis between two attached bones, and prevents any linear translation to ensure that the attached bones remain connected at a common point.

Each degree of freedom of a joint is referred to herein as a parameter of the joint or a "joint parameter." For example, a revolute joint has a joint parameter that is an angle and is also referred to herein as a "joint rotation parameter." In another example, a prismatic joint has a joint parameter that is a length, a distance, or a position and is also referred to herein as a "joint translation parameter." For explanatory purposes, a value for a joint parameter is also referred to herein as a "joint parameter value." Each joint parameter value can be expressed in any technically feasible fashion. In some embodiments, each joint and/or the associated joint parameter(s) can be associated with any number and/or types of constraints. For instance, in some embodiments, a revolute joint can be associated with a maximum angle and a minimum angle that constrain the allowed rotation of the revolute joint and therefore constrain the associated joint parameter values.

The joints in a skeleton can be organized into any number of joint chains. In some embodiments, each joint chain in a skeleton is a sequence of linearly connected joints and associated bones that inherits the hierarchy of the skeleton. As used herein, a "start" joint and an "end" joint of a joint chain refer to joints of the joint chain that are highest and lowest, respectively, in the hierarchy of the skeleton and therefore the joint chain. In general, rotating and/or translating a joint in a joint chain affects any joints (and the associated bones) that are lower in the hierarchy of the joint chain. A start of a joint chain can be a start joint in the joint chain or a link that drives the start joint. An end of a joint chain can be an end joint of the joint chain or a link that is driven by the end joint. As used herein, an end-effector or "end-effector" of a joint chain refers to the end of a joint chain and can have a position and/or an orientation.

For explanatory purposes, a set of values for a complete set of joint parameters associated with a joint chain is referred to herein as a "configuration vector" and defines a configuration of the joint chain. As used herein, a "vector" is an ordered set of zero or more values or "scalars." The values in a vector are also referred to collectively as "elements" of the vector and individually as an "element" of the vector. A set, an ordered list and a tuple are three common examples of vectors.

Values for joint parameters or "joint parameter values" can be defined, specified, and/or represented in any technically feasible fashion. For instance, in some embodiments, a value for a joint parameter associated with a revolute joint is specified as a "joint angle" between the two links connected by the revolute joint in a plane of rotation of the revolute joint. A space of all possible configurations of a joint chain is commonly referred to as a "joint space" and a "configuration space" of the joint chain. The number of dimensions of a joint space of a joint chain is equal to the number of joint parameters associated with the joint chain and therefore the number of joint parameters associated with a configuration vector.

In some embodiments, each configuration of a joint chain defines a unique and unambiguous position, orientation, or pose for an end-effector of the joint chain. As used herein, a "pose" of an object (e.g., an end-effector) refers to a combination of a position and an orientation of the object. In general, positions and orientations of objects can be defined, specified, and represented with respect to any other object(s), in any frame of reference, and in any technically feasible fashion. For instance, in some embodiments, a position and/or orientation for an end-effector of a joint chain is specified relative to a position and/or orientation for a start joint of the joint chain. In the same or other embodiments, a position specifies, without limitation, one or more position components. For example, a 3D position can be specified via an x coordinate, a y coordinate, and a z coordinate. In some embodiments, an orientation specifies, without limitation, one or more orientation components. For example, a 3D orientation can be represented via three Euler angles as a roll angle, a pitch angle, and a yaw angle or via four quaternion coordinates ($q_0$, $q_1$, $q_2$, $q_3$).

Computing a position and/or orientation for an end-effector of a joint chain and optionally any number of links of the joint chain based on a joint vector for the joint chain is referred to as "forward kinematics" and solving an "forward kinematic problem." As persons skilled in the art will recognize, a single, unambiguous pose of an end-effector of a joint chain can be computed via one or more kinematic equations of the joint chain. The kinematic equation(s) of a joint chain connect the pose of the end-effector of the joint chain to the joint parameters of the joint chain and can typically be expressed relatively simply in closed-form (e.g., via trigonometric formulas) based on the spatial geometry of the joint chain.

A space of all possible poses of an end-effector of a joint chain that are relevant to a specific task is commonly referred to as a "task space" of the joint chain. For explanatory purposes, a set of values for a set of components (e.g., position components, orientation components, position/orientation components) associated with an end-effector of a joint chain corresponding to a point in task space is also referred to herein as an "end-effector vector." In some embodiments, a task space for a joint chain is a set of end-effector vectors specifying possible 6D poses (e.g., a combination of a 3D position and a 3D orientation) for an end-effector of the joint chain. In some other embodiments, a task space for a joint chain is a set of end-effector vectors specifying possible 3D positions for an end-effector of the joint chain. In yet other embodiments, a task space for a joint chain is a set of end-effector vectors specifying possible combinations of a 2D position and a one-dimensional (1D) orientation.

Computing a joint vector for a joint chain that achieves or comes as close as possible to achieving a target position and/or a target orientation for an end-effector of the joint chain is referred to as "inverse kinematics" and solving an "inverse kinematic (IK) problem." A target position and/or a target orientation for an end-effector is also referred to herein as an "end-effector target." In some embodiments, an end-effector target is specified as an end-effector vector.

If an end-effector target is unreachable via a joint chain, then a solution to the IK problem is a joint vector that defines a configuration of the joint chain for which the end-effector comes as close as possible to the end-effector target. If, however, an end-effector target is reachable via a joint chain and the number of dimensions of a joint space associated with an IK problem is no greater than the number of dimensions of a task space associated with the IK problem, then a finite number of solutions to the IK problem exist. If, however, an end-effector target is reachable via a joint chain and the number of dimensions of a joint space associated with an IK problem is greater than the number of dimensions of a task space associated with the IK problem, then an infinite number of solutions to the IK problem exist. If an infinite number of solutions to an IK problem exist, then the associated joint chain is referred to as "redundant" with respect to the associated task space (and therefore the associated task).

In some embodiments, a computer animation application enables animation of at least one joint chain included in at least one rigged character via a GUI and IK. In the same or other embodiments, an end-effector target is defined via a GUI element referred to herein as an "end-effector handle." In some embodiments, in response to manipulation of the end-effector handle associated with a joint chain, the computer animation application executes an inverse kinematic solver to compute a configuration vector that specifies a set of joint parameter values for the joint chain that causes an end-effector of the joint chain to reach or come as close as possible to reaching the end-effector handle. The computer animation application applies the new configuration vector to the joint chain to move the end-effector to or as close as possible to the end-effector handle.

As described previously herein, a conventional approach to generating an inverse kinematic solver for a joint chain involves selecting and configuring a sequence of one or more pre-generated inverse kinematic solvers that are associated with the computer animation software application.

One drawback of pre-generated inverse kinematic solvers, though, is that the level of traditional rigging expertise and/or the amount of time required to select and configure a sequence of inverse kinematic solvers to properly animate a complex and/or atypical joint chain can be prohibitive. For example, an inexperienced user could be unable to determine how to modify a sequence of inverse kinematic solvers to prevent various joints from "popping out" at unexpected angles. Another drawback is that when multiple configurations of a joint chain can achieve the same end-effector target, conventional inverse kinematic solvers determine a single configuration of the joint chain that achieves the end-effector target without taking into account any user preferences. As a result, conventional inverse kinematic solvers oftentimes cannot be configured to account for user-specific goals.

Automatically Generating Trained IK Solvers

To address the above problems, in some embodiments, the compute instance 110(1) includes, without limitation, an IK modeling application 140 that uses forward kinematics and machine learning (ML) techniques to automatically generate one or more trained IK models for each of any number of arbitrary joint chains. As described in greater detail below, to generate a trained IK model in some embodiments, a training engine 142 included in the IK modeling application 140 generates numerous GT configuration vectors, where each GT configuration vector specifies a set of valid values for a set of joint parameters of a joint chain. For each GT configuration vector, the training engine 142 directly or indirectly (e.g., via another software application) computes, via forward kinematics, a corresponding end-effector vector. The GT configuration vector and the corresponding end-effector vectors are collectively referred to herein as "GT data." The training engine 142 then performs any number and/or type of supervised learning operations on a ML model based on the GT data to generate a trained IK model.

Advantageously, because the end-effector vectors for which the corresponding GT configuration vectors are IK solutions can be computed automatically using forward kinematics and therefore relatively simple kinematic equations, both the level of traditional rigging expertise and the amount of time required to achieve effective IK control over a joint chain and an associated rigged character can be reduced. To further reduce the time required to achieve effective IK control over a joint chain, in some embodiments, the training engine 142 can cause multiple tasks or multiple instances of another software application to use forward kinematics (e.g., execute forward kinematic operations) to compute at least partially in parallel, the end-effector vectors corresponding to the GT configuration vectors. For instance, in some embodiments, for each GT configuration vector, the training engine 142 could cause a different instance of a computer animation application executing within a cloud computing environment to compute a corresponding end-effector vector.

Notably, in some embodiments, IK modeling application 140 substantially reduces the amount of time required to achieve effective IK control over duplicate or mirror copies of joint chains. For example, the IK modeling application 140 can automatically generate different trained IK models and optionally different trained IK solvers for a joint chain associated with a left leg and a reflection of the joint chain that is associated with a right leg.

In some embodiments, the IK modeling application 140 can generate any number of trained IK models (and optionally associated trained IK solvers) that are used to solve IK problems for object animations. As referred to herein, "object animations," refers to generating an animation of a digital object in any type of graphics or computer animation system. In some embodiments, each trained IK model can be used alone or in conjunction with an associated trained IK solver to automatically solve IK problems when generating object animations. In particular, a trained IK solver can be attached to a skeleton as an animation controller to generate a rig for an object for the purposes of computer animation.

As persons skilled in the art will recognize, the concepts described herein are also applicable to creating trained IK models (and optionally associated trained IK solvers) that are used to solve IK problems and/or performing other tasks associated with a wide range of fields. For instance, in some embodiments, trained IK models can be used to solve IK problems in robotics and human-robot interaction.

As described in greater detail below, each trained IK model predicts approximate solutions to IK problems in a different IK problem space. As used herein, each IK problem space is a different set of all possible IK problems associated with a different combination of a joint chain, a target space associated with an end-effector of the joint chain, and optionally a targeted joint parameter subset that is a subset of a set of joint parameters associated with the joint chain.

Each joint parameter that is included in the targeted joint parameter subset is a target with respect to the trained IK model and is also referred to herein as a "targeted joint parameter." Each joint parameter in the joint parameter set that is not included in the targeted joint parameter subset is a variable with respect to the trained IK solver and is also referred to herein as a "variable joint parameter." The IK modeling application 140 can determine a targeted joint parameter subset in any technically feasible fashion.

For instance, in some embodiments, if a joint chain is not redundant with respect to a task space, then the IK modeling application 140 sets a corresponding targeted joint parameter subset to an empty subset. In the same or other embodiments, if a joint chain is redundant with respect to a task space, then the IK modeling application 140 generates a corresponding targeted joint parameter subset that includes, without limitation, zero or more joint parameters that are designated as "user-configurable" joint parameters or input parameters of an ML model that is trained to generate a corresponding trained IK model. As used herein, an "input parameter" of any type of ML model is a parameter associated with one or more values that are inputs to the ML model, and an "output parameter" of any type of ML model is a parameter associated with one or more values that are outputs of the ML model."

In some embodiments, the joint parameters and/or representations of the joint parameters included in the targeted joint parameter subset are to be inputs to or input parameter(s) instead of output parameter(s) of a corresponding trained IK model and/or a corresponding trained IK solver. As used herein, a user-configurable joint parameter and a targeted joint parameter both refer to a joint parameter that is an input parameter of trained IK model instead of an output parameter of the trained IK model. The training engine 142 can determine whether a joint parameter is to be an input parameter of the trained IK model in any technically feasible fashion.

Advantageously, each targeted joint parameter can provide additional user control over a joint chain and a corresponding rigged character that would be difficult, if not impossible, to achieve using conventional IK solvers. The training engine 142 can determine target values for targeted joint parameters in any technically feasible fashion. For instance, in some embodiments, a computer animation application displays a different controller or any other interactive graphical user interface (GUI) component for each targeted joint parameter via a GUI. In the same or other embodiments, the user manipulates displayed controller(s) or other interactive GUI components via the GUI to set target values for the associated targeted joint parameters. In some embodiments, the training engine 142 interacts with the computer animation application via an application programming interface (API) to determine the target value(s) for targeted joint parameter(s), As shown, in some embodiments, the IK modeling application 140 resides in the memory 116(1) of the compute instance 110(1) and executes on the processor 112(1) of the compute instance 110(1). In the same or other embodiments, the IK modeling application 140 includes, without limitation, the training engine 142, the trained IK model 148, an IK solver generator 150, and the trained IK solver 158.

In some embodiments the training engine 142 generates the trained IK model 148 based on a target IK problem space specification (not shown in FIG. 1). In the same or other embodiments, the target IK problem space specification identifies, without limitation, a target joint chain, a target task space, and optionally a targeted joint parameter subset. The training engine 142 can determine the target IK problem space specification in any technically feasible fashion. In some embodiments, the training engine 142 determines a target IK problem space specification based on any amount and/or types of input received via one or more of a user interface, a graphical user interface (GUI), or an application programming interface (API).

In some other embodiments, the training engine 142 interacts with an instance of a computer animation application denoted as a computer animation application 120(1) via an API to determine the target IK problem space specification. As shown, in some embodiments, the computer animation application 120(1) resides in the memory 116(1) of the compute instance 110(1) and executes on the processor 112(1) of the compute instance 110(1). In the same or other embodiments, the computer animation application 120(1) includes, without limitation, a rigged character 130(1) that is an instance of a rigged character.

As shown, in some embodiments, the rigged character 130(1) includes, without limitation, a skeleton (not shown) and an FK setup 132 for the skeleton. The skeleton includes, without limitation, one or more joint chains. The FK setup 132 can solve FK problems associated with any portion (including all) of the skeleton and therefore any of the joint chains included in the skeleton in any technically feasible fashion. For instance, in some embodiments, the FK setup 132 solves FK problems for any portions of the skeleton using one or more relatively simple kinematic equations that are defined based on the structure of the skeleton.

In some embodiments, the computer animation application 120(1) generates any number and/or types of GUI components that are each associated with any portion of the skeleton and/or the FK setup 132 in any technically feasible fashion. In the same or other embodiments, the computer animation application 120(1) generates the target IK problem space specification based on selections made by a user via a graphical user interface (GUI) (not shown) and any number of interactive GUI components associated with the rigged character 130(1).

As shown, in some embodiments, the training engine 142 generates a GT configuration vector 134(1)—a GT configuration vector 134(N) based on the target joint chain specified in the target IK problem space specification, where N can be any positive number. For explanatory purposes, the GT configuration vector 134(1)—the GT configuration vector 134(N) are also referred to herein individually as the "GT configuration vector 134" and collectively as the "GT configuration vectors 134" and the "GT configuration vectors 134(1)-134(N)."

In some embodiments, each of the GT configuration vectors 134 includes, without limitation, a different set of valid values for the set of joint parameters associated with the target joint chain. The training engine 142 can generate the GT configuration vectors 134 in any technically feasible fashion. As described in greater detail below in conjunction with FIG. 2, in some embodiments, the training engine 142 uses motor babbling to generate the GT configuration vectors. As used herein "motor babbling" refers to randomly or pseudo-randomly selecting a value from a set or range of valid values for each joint parameter of a joint chain to generate a vector that specifies a valid configuration for the joint chain.

In some other embodiments, the training engine 142 can randomly or pseudo-randomly generate the GT configuration vectors 134 in any other technically feasible fashion. In yet other embodiments, the training engine 142 can sample the configuration space of the joint chain in a regular, irregular, or any other fashion to generate the GT configuration vectors 134.

As shown, in some embodiments, the training engine 142 computes or causes any number of instances of any number of other software applications to compute an end-effector vector 136(1)—an end-effector vector 136(N) based on the GT configuration vectors 134(1)-134(N). For explanatory purposes, the end-effector vector 136(1)—the end-effector vector 136(N) are also referred to herein individually as the "end-effector vector 136" and collectively as the "end-effector vectors 136" and the "end-effector vectors 136(1)-136(N)."

Each end-effector vector 136($x$), where x can be any integer from 1 through N, is a FK solution to a FK problem specified by the GT configuration vector 134($x$). Since each end-effector vector 136 can be computed independently of other end-effector vectors 136, the training engine 142 can compute or cause any number of instances of any number of other software applications the end-effector vectors 136 concurrently, sequentially, or in any combination thereof.

The training engine 142 and or any other software application can use forward kinematics to compute the end-effector vectors 136(1)-136(N) corresponding to the GT configuration vectors 134(1)-134(N) in any technically feasible fashion. As shown, in some embodiments, the training engine 142 causes the FK setup 132 to apply FK equations associated with the target joint to the GT configuration vectors 134(1)-134(N) to compute the end-effector vectors 136(1)-136(N) respectively.

In some embodiment, the training engine 142 moves any values corresponding to targeted joint parameters from the GT configuration vectors to the corresponding end-effector vectors and optionally performs any number and/or types of encoding operations on any number and/or types of values in the resulting vectors to generate GT joint vectors and IK target vectors, respectively. As used herein, "encoding" and "decoding" both refer to changing a representation of any number and/or types of positions and/or orientations associated with an end-effector, any number and/or types of values associated with any number and/or types of joint parameters, or any combination thereof in any technically feasible fashion.

As described in greater detail below in conjunction with FIG. 2, in some embodiments, the training engine 142 performs any number and/or types of supervised learning operations on any type of ML model based on the IK target vectors and the corresponding GT joint vectors to train the ML model to map an IK target vector to a predicted joint vector. The trained ML model is also referred to herein as "the trained IK model 148."

Notably, in some embodiments, if the target joint chain is not associated with any targeted joint parameters, then each predicted joint vector includes, without limitation, a representation of a predicted value for each joint parameter associated with the target joint chain. In the same or other embodiments, if the target joint chain is associated with at least one targeted joint parameter, then the predicted joint vector includes, without limitation, a representation of a predicted value for each joint parameter in a proper subset of the joint parameters associated with the target joint chain, where the proper subset excludes each targeted joint parameter. As is well known, a "proper subset" of a set is a subset of the set that excludes at least one element of the set.

As shown, in some embodiments, the IK solver generator 150 generates trained IK solver 158 that encapsulates the trained IK model 148. The IK solver generator 150 can generate the trained IK solver 158 in any technically feasible fashion. In some embodiments, the trained IK solver 158 uses the trained IK model 148 to solve IK problems in the associated target IK problem space for any number of instances of the associated target joint chain. For explanatory purposes, as used herein, "target joint chain" refers to any instance of the target joint chain associated with both the trained IK model 148 and the trained IK solver 158.

In some embodiments, for the target joint chain, the trained IK solver 158 executes the trained IK model 148 to map a target position and/or a target orientation for the end-effector and optionally a target value for each targeted joint parameter to a different predicted value for each variable joint parameter associated with the target joint chain. In the same or other embodiments, the trained IK solver 158 can set or cause another software application to set the value of each variable joint parameter to the corresponding predicted value. In some embodiments, the trained IK solver 158 can perform any number and/or types of other update operations on the target joint chain based on the predicted values for the variable joint parameters.

In some embodiments, the training engine 142, the IK solver generator 150, the IK modeling application 140, or any combination thereof can store the trained IK model 148 and/or the trained IK solver 158 in each of any number and/or types of available memories. In the same or other embodiments, the training engine 142, the IK solver generator 150, the IK modeling application 140, or any combination thereof can transmit the trained IK model 148 and/or the trained IK solver 158 to any number and/or types of software applications.

For explanatory purposes, the trained IK model 148 and the trained IK solver 158 are described below in the context of predicting approximate solutions to IK problems associated with an exemplary IK problem space. The exemplary IK problem space is the set of all possible IK problems associated with both an exemplary joint chain having four revolute joints that are associated with four variable joint parameters and an exemplary task space of all possible 3D positions for an end-effector of the joint chain.

Also for explanatory purposes, in some embodiments, the trained IK model 148 described below maps an IK target vector 170 to a predicted joint vector 178. As shown, in some embodiments, the IK target vector 170 is denoted as (x, y, z) and specifies an x-coordinate, a y-coordinate, and a z-coordinate of a target position for the end-effector of the target joint chain. In the same or other embodiments, the predicted joint vector 178 is denoted as $(\sin(\theta_1), \cos(\theta_1), \sin(\theta_2), \cos(\theta_2), \sin(\theta_3), \cos(\theta_3), \sin(\theta_4), \cos(\theta_4))$ and specifies both a predicted sine and a predicted cosine for each variable joint parameter associated with the target joint chain.

Note, however, that the functionality and techniques described herein are illustrative rather than restrictive and can be altered without departing from the broader spirit and scope of the invention. Many modifications and variations on the functionality of the IK modeling application 140, the training engine 142, any number of trained IK models, and any number of trained IK solvers as described herein will be apparent to those of ordinary skill in the art without departing from the scope and spirit of the described embodiments.

In particular, the disclosed techniques can be used to generate trained IK models, generate trained IK solvers, and solve IK problems associated with arbitrary joint chains, arbitrary task spaces, any number (including none) of targeted joint parameters, and one or more variable joint parameters. Accordingly, the disclosed techniques can be used to solve IK problems associated with a wide range of joint chains, rigged characters, robotic mechanisms, etc.

For instance, although not shown, in some embodiments, a trained IK model is associated with an exemplary joint chain having three revolute joints that are associated with variable joint parameters, a fourth revolute joint that is associated with a targeted joint parameter, and an exemplary task space of all possible 3D positions for an end-effector of the joint chain. In the same or other embodiments, the trained IK model maps an IK target vector denoted as $(x, y, z, \theta_4)$ to a predicted joint vector denoted as $(\sin(\theta_1), \cos(\theta_1), \sin(\theta_2), \cos(\theta_2), \sin(\theta_3), \cos(\theta_3))$.

As shown, in some embodiments, the IK solver generator 150 transmits the trained IK solver 158 to a computer animation application 120(2). In some embodiments, the computer animation application 120(1) and the computer animation application 120(2) are two different instances of a single computer animation application. As shown, the computer animation application 120(2) resides in the memory 116(2) of the compute instance 110(2) and executes on the processor 112(2) of the compute instance 110(2). In the same or other embodiments, the computer animation application 120(2) includes, without limitation, a rigged character 130(2). In some embodiments, the rigged character 130(1) and the rigged character 130(2) are two different instances of a single rigged character.

In some embodiments, the rigged character 130(2) includes, without limitation, a skeleton (not shown). the trained IK solver 158 and a joint parameter 198(1)—a joint parameter 198(4). For explanatory purposes, the joint parameter 198(1)—the joint parameter 198(4) are also referred to herein collectively as the "joint parameter 198" and collectively as the "joint parameters 198(1)-198(4)" and the "joint parameters 198(1)-198(4)." In some other embodiments, the rigged character 130(2) can include, without limitation, any number and/or types of joint parameters.

As shown, in some embodiments, the computer animation application 120(2) generates and displays a rig view 190 within a GUI 108. In the same or other embodiments, the GUI 108 is displayed on the display screen 102 in any technically feasible fashion. As shown, in some embodiments, the rig view 190 depicts the target joint chain and provides, without limitation, a root handle 162 and an end-effector handle 164. In the same or other embodiments, the root handle 162 and the end-effector handle 164 are GUI elements that are used to specify a start or "root" of the target joint chain and an end-effector of the target joint chain, respectively.

In some embodiments, in response to manipulation of the end-effector handle 164, the computer animation application 120(2) executes the trained IK solver 158 to update the joint parameters 198(1)-198(4) to values that cause the end-effector of the target joint chain to reach or come as close as possible to reaching the end-effector handle 164. For explanatory purposes, the rig view 190 depicts the target joint chain after the trained IK solver 158 has successfully updated the joint parameters 198(1)-198(4). Accordingly, the end-effector of the target joint chain is coincident with the end-effector handle 164.

In some embodiments, the trained IK solver 158 sets the IK target vector 170 equal to the 3D position of the end-effector handle 164 relative to the root handle 162. In some other embodiments, the trained IK solver 158 sets the IK target vector 170 equal to a target position and/or target orientation for the end-effector or an end of the joint chain relative to a position and/or orientation for a start of the joint chain in any technically feasible fashion. The trained IK solver 158 then executes the trained IK model 148 on the IK target vector 170. In response, the trained IK solver 158 generates the predicted joint vector 178. Because the predicted joint vector 178 is an encoded representation of predicted joint angles, the trained IK solver 158 executes a decoding function 180 on the predicted joint vector 178.

As shown, in some embodiments, the decoding function 180 maps $(\sin(\theta), \cos(\theta))$ to a $\tan 2(\sin(\theta), \cos(\theta))$. As persons skilled in the art will recognize, the value of a $\tan 2(\sin(\theta), \cos(\theta))$ is $\theta$. Accordingly, the trained IK solver 158 uses the decoding function 180 to map the predicted joint vector 178 that is denoted as $(\sin(\theta_1), \cos(\theta_1), \sin(\theta_2), \cos(\theta_2), \sin(\theta_3), \cos(\theta_3), \sin(\theta_4), \cos(\theta_4))$ to predicted joint angles $\theta_1$, $\theta_2$, $\theta_3$, and $\theta_4$, for the joint parameters 198(1)-198(4), respectively. In some embodiments, the trained IK solver 158 or the computer animation application 120(2) sets the values of the joint parameters 198(1)-198(4) equal to the predicted joint angles $\theta_1$, $\theta_2$, $\theta_3$, and $\theta_4$, respectively. As a result in some embodiments, and as depicted in the rig view 190, the computer animation application 120(2) moves the end-effector of the target joint to a position that is coincident with the end-effector handle 164.

It will be appreciated that the system 100 shown herein is illustrative and that variations and modifications are possible. For example, the functionality provided by the IK modeling application 140, the trained IK model 148, the trained IK solver 158, the computer animation application 120(1), the computer animation application 120(2), or any combination thereof can be integrated into or distributed across any number of software applications (including one). Further, the connection topology between the various units in FIG. 1 can be modified as desired.

Using Forward Kinematics to Train ML Models to Solve IK Problems

Figure 2:
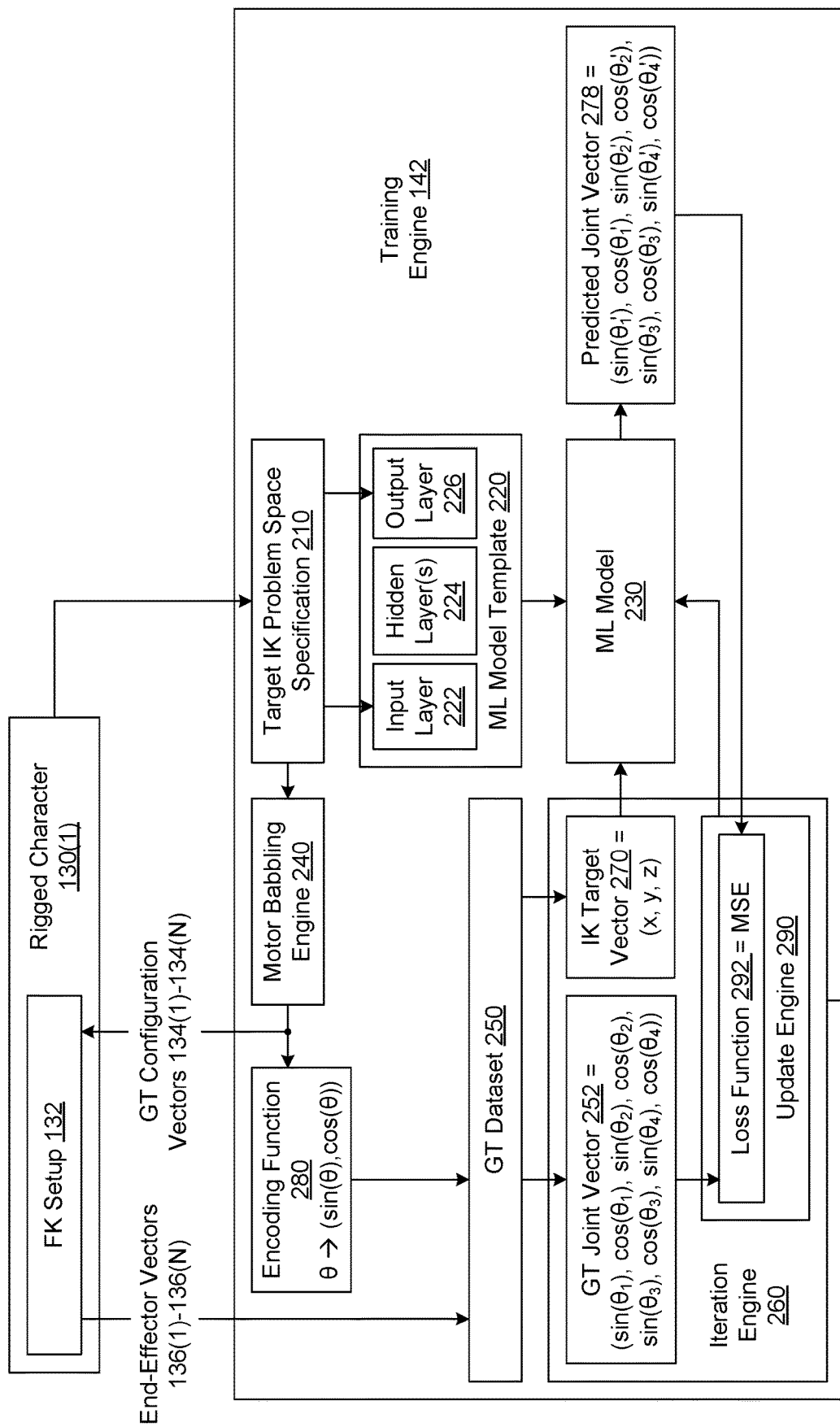
FIG. 2 is a more detailed illustration of the training engine of FIG. 1, according to various embodiments.

FIG. 2 is a more detailed illustration of the training engine 142 of FIG. 1, according to various embodiments. For explanatory purposes, the training engine 142 is depicted and described in conjunction with FIG. 2 in the context of some embodiments of the training engine 142 that generate the trained IK model 148 that predicts approximate solutions to IK problems associated with the exemplary IK problem space described previously herein in conjunction with FIG. 2. In particular, the trained IK model 148 in some embodiments that are depicted and described in conjunction with FIG. 2 maps the IK target vector 170 to the predicted joint vector 178.

Note, however, that the functionality and techniques described herein are illustrative rather than restrictive and can be altered without departing from the broader spirit and scope of the invention. Many modifications and variations on the functionality of the training engine 142 and/or the trained IK model 148 as described herein will be apparent to those of ordinary skill in the art without departing from the scope and spirit of the described embodiments.

In particular, the disclosed techniques can be used to generate any number and/or types of trained IK models associated with arbitrary joint chains, arbitrary task spaces, any number (including none) of targeted joint parameters, and one or more variable joint parameters in any technically feasible fashion. Furthermore, the disclosed techniques can be used to generate GT joint vectors that include, without limitation, any amount and/or types of data associated with any number and/or types of joint parameters. The disclosed techniques can be used to generate IK target vectors that each include, without limitation, any amount and/or types of data associated with at least one of a position or an orientation for an end-effector and optionally any number and/or types of joint parameters. The disclosed techniques can be used to generate and/or determine any type of ML model and generate a corresponding trained IK model that each map an IK target vector to a predicted joint vector that includes, without limitation, any amount and/or types of data associated with any number and/or types of joint parameters (e.g., each variable joint parameter).

For instance, in some other embodiments, the training engine 142 can generate a trained IK model having an IK target vector that represents an optionally encoded target position and/or an optionally encoded target orientation for an end-effector and a different optionally encoded value for each of zero or more targeted joint parameters. In the same or other embodiments, the training engine 142 can predict an optionally encoded value for each of one or more variable joint parameters.

As shown, in some embodiments, the training engine 142 includes, without limitation, a target IK problem space specification 210, an ML model template 220, an ML model 230, a motor babbling engine 240, an encoding function 280, a GT dataset 250, and an iteration engine 260. In the same or other embodiments, the training engine 142 can interact with the rigged character 130(1) and/or the FK setup 132 included in the rigged character 130(1) in any technically feasible fashion (e.g., via an API).

In some embodiments, the target IK problem space specification 210 describes a target IK problem space in any technically feasible fashion. As described previously herein in conjunction with FIG. 1, the target IK problem space specification 210 identifies, without limitation, a target joint chain, a target task space, and optionally a targeted joint parameter subset. As also described previously herein in conjunction with FIG. 1, the training engine 142 can determine the target IK problem space specification 210 in any technically feasible fashion.

As shown, in some embodiments, the training engine 142 interacts with the rigged character 130(1) in any technically feasible fashion (e.g., via an API) to determine the target IK problem space specification 210. In some embodiments, including some embodiments depicted in and described in conjunction with FIG. 2, the target IK problem space specification 210 specifies the exemplary target IK problem space that is the set of all possible IK problems associated with both an exemplary joint chain having four revolute joints that are associated with four variable joint parameters and an exemplary task space of all possible 3D positions for an end-effector of the joint chain. In the context of FIG. 2, the exemplary joint chain and the exemplary task space are also referred to as the "target joint chain" and the "target task space," respectively.

As shown, in some embodiments, the training engine 142 customizes the ML model template 220 based on the target IK problem space specification 210 to generate the ML model 230. The ML model template 220 can be any portions (including all) of any type of ML model that is capable of being trained via any number and/or types of supervised learning operations to predicate approximate solutions to IK problems associated with arbitrary joint chains and arbitrary task spaces.

In some embodiments, the ML model template 220 can be any neural network (e.g., a multi-layer perceptron) that includes, without limitation, an input layer 222, one or more hidden layer(s) 224, and an output layer 226. In some embodiments, the training engine 142 modifies the input layer 222 and the output layer 226 of the ML model template 220 in any technically feasible fashion to generate the ML model 230 but does not modify the hidden layer(s) 224.

More particular, in some embodiments, the training engine 142 modifies the input layer 222 to reflect a length (in numbers) of an IK target vector representing a position and/or orientation of a point in the target task space and a different value for each of zero of more targeted joint parameters. In the same or other embodiments, the training modifies the output layer 226 to reflect a length (in numbers) of a predicted joint vector representing a different value for each of one or more variable joint parameters. The training engine 142 can determine the lengths of an IK target vector and a predicted joint vector in any technically feasible fashion.

For instance, in some embodiments, the training engine 142 generates trained ML models that represent 3D positions of the end-effector as three values—an x-coordinate, a y-coordinate, and a z-coordinate. In the same or other embodiments, because the target task space is a set of all possible 3D positions of the end-effector of the joint chain, the training engine 142 customizes the input layer 222 to operate on three numbers.

In some embodiments, the training engine 142 represents each predicted value for a joint parameter associated with a revolute joint as two values—a predicted sine of a joint angle and a predicted cosine of the joint angle. In the same or other embodiments, because the target joint chain has four revolute joints that are associated with four variable joint parameters, the training engine 142 customizes the output layer 226 to generate eight numbers.

Although not shown, in some other embodiments, the training engine 142 can determine and/or generate the ML model 230 in any technically feasible fashion instead of customizing the ML model template 220. For instance, in some embodiments, the training engine 142 selects the ML model 230 from a library of ML models based on, at least in part, the target IK problem space specification 210. In the same or other embodiments, the ML model template 220 is omitted from the training engine 142.

As described previously herein in conjunction with FIG. 1, the training engine 142 can generate the GT configuration vectors 134(1)-134(N) in any technically feasible fashion. As shown, in some embodiments, the motor babbling engine 240 generates the GT configuration vectors 134(1)-134(N) based on the target IK problem space specification 210.

More precisely, in some embodiments, the motor babbling engine 240 generates the GT configuration vectors 134(1)-134(N) based on the number, types, and valid ranges of the joint parameters associated with the target joint chain.

In some embodiments, to generate each of the GT configuration vectors 134, the motor babbling engine 240 generates a random value for each joint parameter that lies within the valid range of the joint parameter. In the same or other embodiments, for each GT configuration vector 134(x), where x is an integer from 1 through N, the motor babbling engine 240 interacts with the rigged character 130(1) and/or the FK setup 132 in any technically feasible fashion to set the values of the joint parameters associated with the target join chain to the corresponding values in the GT configuration vector 134(x). For explanatory purposes, values in the GT configuration vectors 134 are also referred to herein as "GT values."

In response, the FK setup 132 in some embodiments modifies the position and/or orientation of the end-effector of the target joint chain. In some embodiments the motor babbling engine 240 interacts with the rigged character 130(1) and/or the FK setup 132 in any technically feasible fashion to measure the position and/or orientation of the end-effector of the target joint chain (adjusted as per the GT configuration vector 134(x)) relative to the start of the target joint chain that corresponds to the GT configuration vector 134(x). In the same or other embodiments, the motor babbling engine 240 sets the end-effector vector 136(x) to specify the position and/or the orientation of the end-effector of the target joint chain corresponding to the GT configuration vector 134(x).

As described previously herein in conjunction with FIG. 1, in some embodiments, the training engine 142 moves any values corresponding to targeted joint parameters from the GT configuration vectors 134 to the corresponding end-effector vectors 136. In some embodiments, after ensuring that the GT configuration vectors 134 do not represent any targeted joint parameters, the training engine 142 performs any number (including none) and/or types of encoding operations on the GT configuration vectors 134(1)-134(N) to generate N different GT joint vectors (not shown). In the same or other embodiments, after ensuring that the end-effector vectors 136 represent the end-effector and each targeted joint parameter, the training engine 142 performs any number (including none) and/or types of encoding operations on the end-effector vectors 136(1)-136(N) to generate N different IK target vectors (not shown). In some embodiments, the training engine 142 stores the GT joint vectors and the IK target vectors in the GT dataset 250.

In some embodiments, including some embodiments depicted in FIG. 2 that correspond to the target IK problem space specification 210, the target joint chain is not associated with any targeted joint parameters. Accordingly, each of the GT configuration vectors 134 and each of the GT joint vectors represent all joint parameters associated with the target joint chain, and neither the end-effector vectors 136 nor the IK target vectors represent any joint parameters.

In some embodiments, including some embodiments depicted in FIG. 2, the training engine 142 encodes at least a portion of each of the GT configuration vectors 134 in any technically feasible fashion. In the same or other embodiments, the training engine 142 applies an encoding function 280 to each of the GT configuration vectors 134 to generate a corresponding GT joint vector. As shown, in some embodiments, the encoding function 280 maps a joint angle denoted as $\theta$ to a pair of values that are the sine of the joint angle and the cosine of the joint angle and are denoted as $(\sin(\theta), \cos(\theta))$. In the same or other embodiments, because the target joint chain has four revolute joints that are associated with four variable joint parameters, the training engine 142 generates GT joint vectors that each specify four pairs of values, where each pair of values specifies a sine and a cosine of a value for a different variable joint parameter.

The iteration engine 260 performs any number and/or types of supervised learning operations on the ML model 230 to generate the trained IK model 148. As shown, in some embodiments, the iteration engine 260 optimizes any number of learnable parameters included in the ML model 230 based on a loss function 292 to train the ML model 230 to map an IK target vector to a predicted joint vector. In the same or other embodiments, the iteration engine 260 executes an iterative learning algorithm over the GT dataset 250 for any number of epochs based on any mini-batch size. For explanatory purposes, the functionality of the iteration engine 260 is described below in the context of executing an exemplary iterative learning algorithm over the GT dataset 250 for any number of epochs based on a mini-batch size of one.

As shown, in some embodiments, the iteration engine 260 includes, without limitation, an IK target vector 270, a GT joint vector 252, and an update engine 290. In some embodiments, to initiate each iteration, the iteration engine 260 selects an IK target vector and a corresponding GT joint vector from the GT dataset 250. The iteration engine 260 sets the IK target vector 270 equal to the selected IK target vector and sets the GT joint vector 252 equal to the selected GT joint vector. Subsequently, the iteration engine 260 propagates the IK target vector 270 through the ML model 230 in a forward direction. More specifically, in some embodiments, the iteration engine 260 inputs the IK target vector 270 into the ML model 230. In response, the ML model 230 computes predicted joint vector 278 based on the current values of any number and/or types of learnable parameters included in the ML model 230. As used herein, a "learnable parameter" refers to any parameter included in or associated with an ML model that can be updated or "learned" during any type of training of the ML model. Some common examples of learnable parameters include, without limitation, weights and biases.

As shown, in some embodiments, the IK target vector 270 represents a target 3D position of an end-effector as (x, y, z) and the GT joint vector 252 represents four GT joint angles (denoted as $\theta_1$, $\theta_2$, $\theta_3$, and $\theta_4$) for four joint parameters as $(\sin(\theta_1), \cos(\theta_1), \sin(\theta_2), \cos(\theta_2), \sin(\theta_3), \cos(\theta_3), \sin(\theta_4), \cos(\theta_4))$. In the same or other embodiments, the predicted joint vector 278 represents four predicted joint angles (denoted as $\theta_1'$, $\theta_2'$, $\theta_3'$, and $\theta_4'$) for the four joint parameters as $(\sin(\theta_1'), \cos(\theta_1'), \sin(\theta_2'), \cos(\theta_2'), \sin(\theta_3'), \cos(\theta_3'), \sin(\theta_4'), \cos(\theta_4'))$.

The update engine 290 computes a loss (not shown) associated with the predicted joint vector 278 based on the GT joint vector 252. The update engine 290 can compute a loss associated with the predicted joint vector 278 in any technically feasible fashion. As shown, in some embodiments, the update engine 290 applies the loss function 292 to the predicted joint vector 278 and the GT joint vector 252 to compute the loss associated with the predicted joint vector 278. The loss function 292 can be any type of function that can estimate an error of the predicted joint vector 278 based on the GT joint vector 252 in any technically feasible fashion. In some embodiments, the loss function 292 computes a mean-squared error (MSE) of the predicted joint vector 278. More precisely, in some embodiments, the loss function 292 sets the loss of the predicted joint vector 278 equal to the average squared difference between the predicted values specified in the predicted joint vector 278 and the corresponding GT values specified in the GT joint vector 252.

In some embodiments, to finish each iteration, the update engine 290 updates or "learns" the learnable parameters included in the ML model 230 to reduce or minimize the loss of the predicted joint vector 278 as per the loss function 292. The update engine 290 can update the learnable parameters included in the ML model 230 in any technically feasible fashion.

As shown, in some embodiments, the update engine 290 uses backpropagation to compute the gradient of the loss function 292. The gradient of the loss function 292 is a vector of the partial derivatives of the loss function 292 with respect to each of the learnable parameters included in the ML model 230. In some embodiments, the update engine 290 executes a backpropagation algorithm on the ML model 230 to compute the partial derivatives of the loss function 292 with respect to the learnable parameters included in the ML model 230 in a backward direction though the ML model 230. In the same or other embodiments, the update engine 290 therefore traverses the ML model 230 from an output layer through an input layer to compute the gradient of the loss function 292.

In some embodiments, the update engine 290 updates the values for the loss function 292 and a goal of reducing or minimizing the loss. The update engine 290 can update the values for the learnable parameters in any technically feasible fashion. For instance, in some embodiments, the update engine 290 uses an optimization algorithm known as gradient descent to update the values of the learnable parameters in accordance with a goal of reaching a local minimum of the loss function 292.

In some embodiments, after each iteration, the iteration engine 260 determines whether the ML model 230 is trained. The iteration engine 260 can determine whether the ML model 230 is trained based on any number and/or types of criteria (e.g., after executing a maximum number of epochs or reaching a target value for a training metric). If the iteration engine 260 determines that the ML model 230 is not trained, then the iteration engine 260 executes another iteration of the exemplary iterative learning algorithm.

When the iteration engine 260 determines that the ML model 230 is trained, the iteration engine 260 terminates the training process. For explanatory purposes only, the updated version of the ML model 230 at the end of the training process is also referred to herein as the trained IK model 148.

Many modifications and variations on the functionality of the training engine 142, the ML model 230, the motor babbling engine 240, the encoding function 280, the update engine 290, the update engine 290, the loss function 292, the exemplary iterative learning algorithm, and the trained IK model 148 as described herein will be apparent to those of ordinary skill in the art without departing from the scope and spirit of the described embodiments. For instance, in some other embodiments, the update engine 290 can execute the exemplary iterative training algorithm for any number of epochs based on any mini-batch size and the techniques described below are modified accordingly. In the same or other embodiments, the update engine 290 can perform any number and/or types of decoding operations on the predicted joint vector 278 and the GT joint vector 252 prior to computing a loss.

Figure 3:
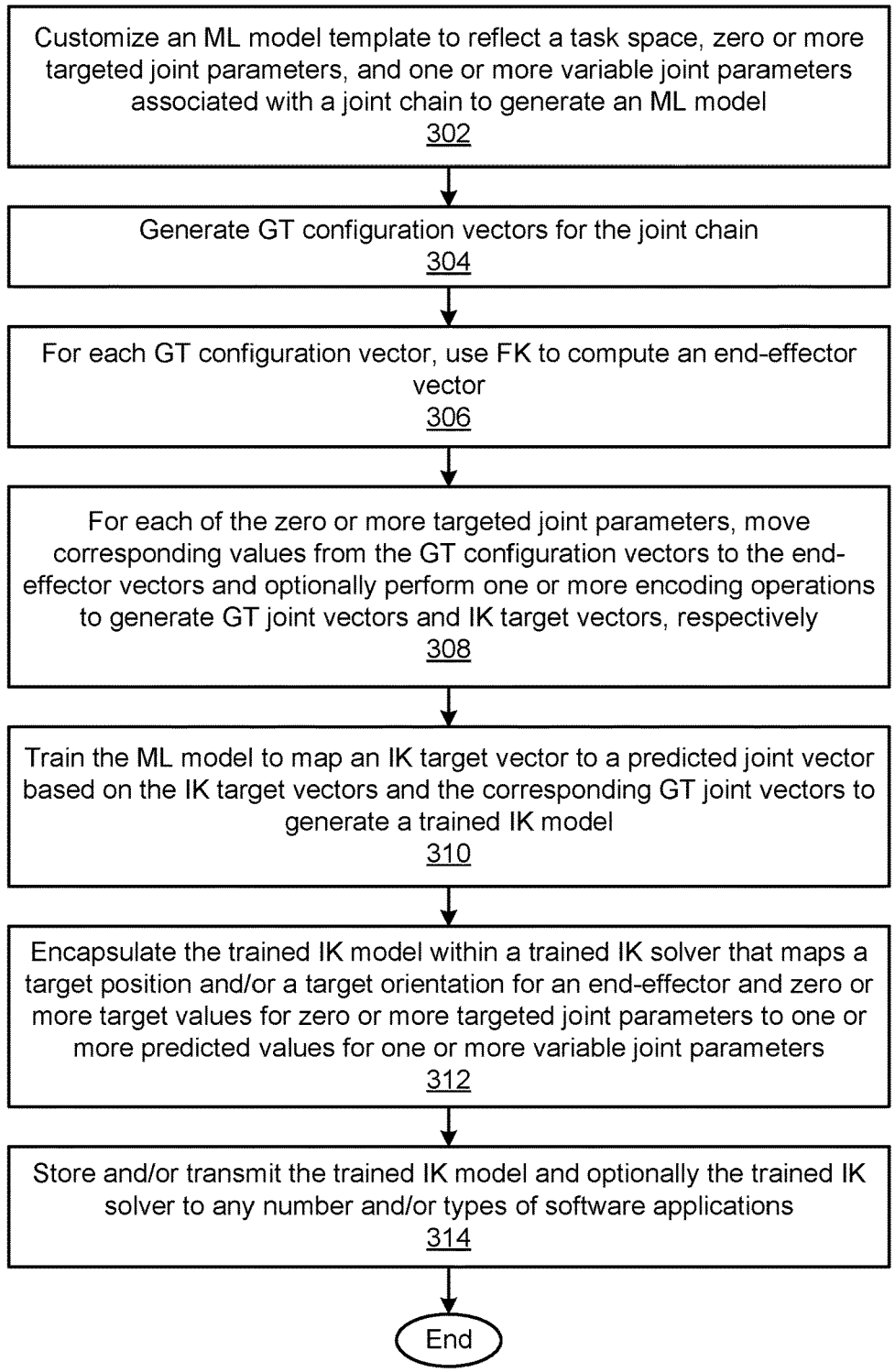
FIG. 3 is a flow diagram of method steps for generating models that are used to solve inverse kinematic problems, according to various embodiments.

FIG. 3 is a flow diagram of method steps for generating models that are used to solve inverse kinematic problems, according to various embodiments. Although the method steps are described with reference to the systems of FIGS. 1 and 2, persons skilled in the art will understand that any system configured to implement the method steps, in any order, falls within the scope of the present invention.

As shown, a method 300 begins at step 302, where the training engine 142 customizes ML model template 220 to reflect a task space, zero or more targeted joint parameters, and one or more variable joint parameters associated with a joint chain to generate ML model 230. At step 304, the training engine 142 generates GT configuration vectors 134 for the joint chain. At step 306, for each GT configuration vector, the training engine 142 uses forward kinematics to compute a corresponding end-effector vector.

At step 308, for each of the zero or more targeted joint parameters, the training engine 142 moves corresponding values from the GT configuration vectors 134 to the end-effector vectors 136 and optionally performs one or more encoding operations to generate GT joint vectors and IK target vectors, respectively. At step 310, the iteration engine 260 trains the ML model 230 to map an IK target vector to a predicted joint vector based on the IK target vectors and the corresponding GT joint vectors to generate trained IK model 148.

At step 312, the IK modeling application 140 encapsulates the trained IK model 148 within trained IK solver 158 that maps a target position and/or a target orientation for an end-effector and zero or more target values for zero or more targeted joint parameters to one or more predicted values for one or more variable joint parameters. At step 314, the IK modeling application 140 stores and/or transmits the trained IK model 148 and optionally the trained IK solver 158 to any number and/or types of software applications. The method 300 then terminates.

Figure 4:
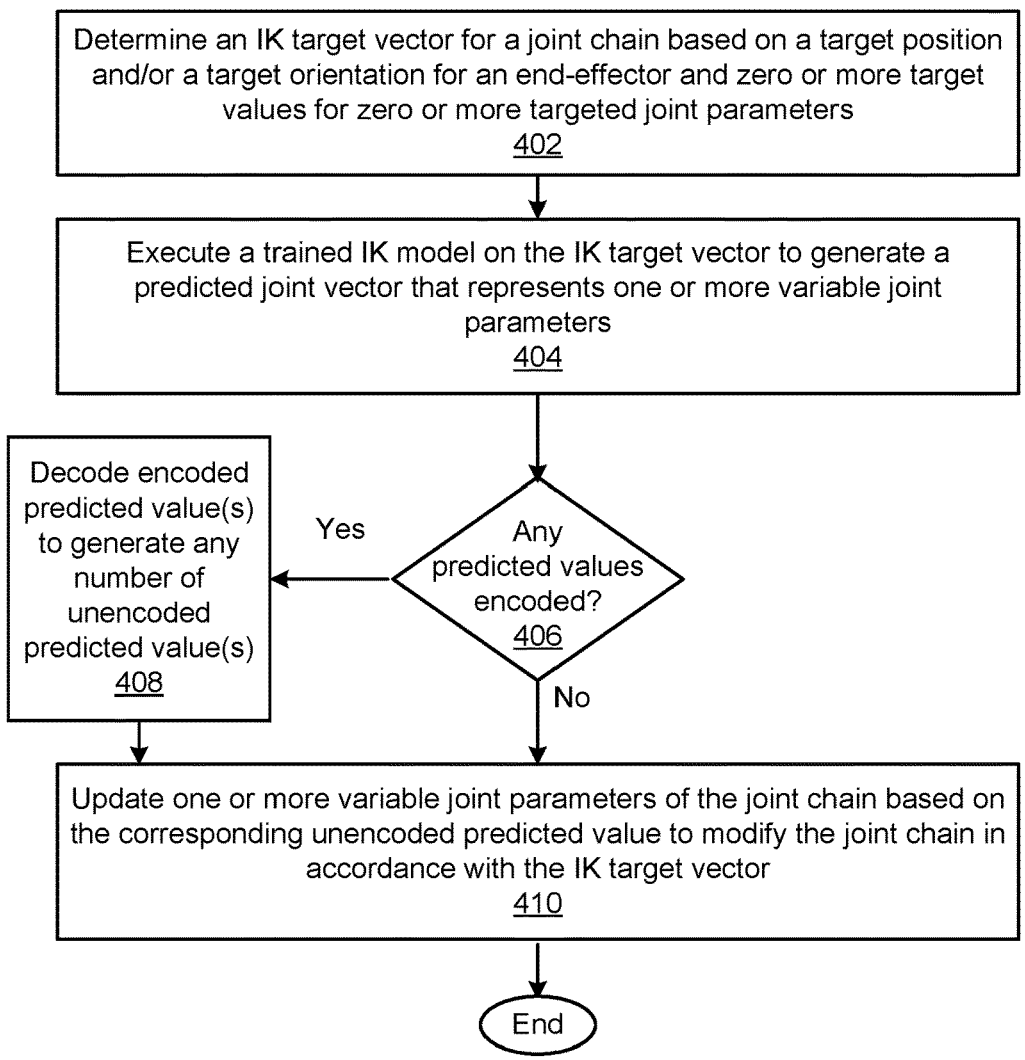
FIG. 4 is a flow diagram of method steps for automatically solving inverse kinematic problems, according to various embodiments.

FIG. 4 is a flow diagram of method steps for automatically solving inverse kinematic problems, according to various embodiments. Although the method steps are described with reference to the systems of FIGS. 1 and 2, persons skilled in the art will understand that any system configured to implement the method steps, in any order, falls within the scope of the present invention.

As shown, the method 400 begins at step 402, where the trained IK solver 158 determines IK target vector 170 for a joint chain based on a target position and/or a target orientation for an end-effector and zero or more target values for zero or more targeted joint parameters. At step 404, the trained IK solver 158 executes the trained IK model 148 on the IK target vector 170 to generate a predicted joint vector that represents one or more variable joint parameters.

At step 406, the trained IK solver 158 determines whether any of the predicted values included in the predicted joint vector are encoded. If, at step 406, the trained IK solver 158 determines that none of the predicted values included in the predicted joint vector are encoded, then the method 400 proceeds directly to step 410.

If, however, at step 406, the trained IK solver 158 determines that one or more of the predicted values included in the predicted joint vector are encoded, then the method 400 proceeds to step 408. At step 408, the trained IK solver 158 decodes encoded predicted value(s) included in the predicted joint vector to generate any number of unencoded predicted values. At step 410, the trained IK solver 158 updates one or more variable joint parameters of the joint chain based on the corresponding unencoded predicted value to modify the joint chain in accordance with the IK target vector 170. The method 400 then terminates.

In sum, the disclosed techniques can be used to automatically generate trained IK models that are optionally encapsulated in trained IK solvers for any number of arbitrary joint chains. In some embodiments, a training engine customizes an input layer and an output layer of an ML template based on a target IK problem space specification to generate an ML model. In the same or other embodiment, the target IK problem space specification identifies, without limitation, a target joint chain, a target task space associated with an end-effector of the target joint chain, and zero or more "targeted" joint parameters associated with the target joint chain. In some embodiments, the input to the ML model is an IK target vector that represents a target position and/or a target orientation for the end-effector and optionally a different target value for each of the zero or more targeted joint parameters. In the same or other embodiments, the output of the ML model is a predicted joint feature vector that specifies both a sine and a cosine of a predicted value for each of one or more "variable" joint parameters associated with the target joint chain.

The training engine randomly or pseudo-randomly generates numerous GT configuration vectors, where each GT configuration vector specifies a set of valid values for the joint parameters of the joint chain. For each GT configuration vector, the training engine uses a computer animation software application to compute, via forward kinematics, a corresponding end-effector vector. The training engine moves any values corresponding to targeted joint parameters from the GT configuration vectors to the corresponding end-effector vectors and optionally performs any number and/or types of encoding operations on any number and/or types of values in the resulting vectors to generate GT joint vectors and IK target vectors, respectively. In some embodiments, values for variable joint parameters in the joint chain are joint angles, and each GT joint vector specifies both a GT sine and a GT cosine of a GT joint angle for each variable joint parameter. The training engine performs any number and/or types of supervised machine learning operations on the ML model based on the IK target vectors and the GT joint vectors to generate a trained IK model that maps an IK target vector to a predicted joint vector.

In some embodiments, the training engine generates and deploys within a computer animation application a trained IK solver that uses the trained IK model to automatically update values of variable joint parameters of the joint chain to approximate an IK target vector. After determining a target position and/or target orientation for an end-effector and optionally a different target value for each of zero or more targeted joint parameters via an API associated with the computer animation application, the trained IK solver generates a corresponding IK target vector. The trained IK solver then executes the trained IK model on the IK target vector. In response, the trained IK model computes a predicted joint vector. In some embodiments, the predicted joint vector specifies both a predicted sine and a predicted cosine for each variable joint parameter in the joint chain. In the same or other embodiments, the trained IK solver computes a predicted joint angle for each variable joint parameter in the joint chain based on the predicted sine and the predicted cosine for the variable joint parameter. The trained IK solver then sets the values of the variable joint parameters equal to the corresponding predicted joint angles. As a result, the computer animation application moves the joint chain to approximate the target position and/or target orientation for an end-effector and optionally the target values for zero or more targeted joint parameters.

At least one technical advantage of the disclosed techniques relative to the prior art is that, with the disclosed techniques, machine learning models of reasonable complexity can be trained to solve inverse kinematic problems for arbitrary joint chains based on automatically generated ground-truth data. Further, because the ground-truth data used to train the machine learning models can be computed automatically using relatively simple kinematic equations, both the level of traditional rigging expertise and the amount of time required to achieve effective inverse kinematic control of a rigged character can be reduced. Another advantage of the disclosed techniques is that, unlike prior art approaches, the parameters of any number of joints in a joint chain can be designated as additional, user-controllable inputs into the machine learning models. Each user-controllable input provides additional user control over a rigged character that would be difficult, if not impossible, to achieve using conventional inverse kinematic solvers. These technical advantages provide one or more technological advancements over prior art approaches.

1. In some embodiments, a computer-implemented method for generating models that are used to solve inverse kinematic problems for object animations comprises generating a plurality of configuration vectors based on a set of joint parameters associated with a joint chain; executing one or more forward kinematic operations on the joint chain based on the plurality of configuration vectors to generate a plurality of target vectors, wherein each target vector included in the plurality of target vectors includes data associated with at least one of a position or an orientation for an end-effector associated with the joint chain; and performing one or more machine learning operations on a machine learning model based on the plurality of configuration vectors and the plurality of target vectors to generate a trained machine learning model that computes a predicted joint vector associated with the joint chain based on at least one of a target position or a target orientation for the end-effector.

2. The computer-implemented method of clause 1, wherein a first configuration vector included in the plurality of configuration vectors comprises a different value for each joint parameter included in the set of joint parameters.

3. The computer-implemented method of clauses 1 or 2, wherein generating a first configuration vector included in the plurality of configuration vectors comprises randomly or pseudo-randomly selecting a first value for a first joint parameter from a valid range of values for the first joint parameter.

4. The computer-implemented method of any of clauses 1-3, further comprising removing a first value for a first joint parameter from a first configuration vector included in the plurality of configuration vectors to generate a first ground-truth joint vector, wherein the first joint parameter is included in the set of joint parameters and is designated as an input parameter of the machine learning model.

5. The computer-implemented method of any of clauses 1-4, wherein the predicted joint vector comprises first data associated with a predicted set of values for the set of joint parameters.

6. The computer-implemented method of any of clauses 1-5, wherein performing the one or more machine learning operations comprises executing the machine learning model on a first target vector included in the plurality of target vectors to generate a first predicted joint vector associated with the joint chain.

7. The computer-implemented method of any of clauses 1-6, wherein performing the one or more machine learning operations comprises applying a loss function to a first configuration vector included in the plurality of configuration vectors and a first predicted joint vector computed via the machine learning model to determine a loss associated with the machine learning model.

8. The computer-implemented method of any of clauses 1-7, wherein performing the one or more machine learning operations comprises modifying a first learnable parameter included in the machine learning model to reduce a loss associated with a first target vector included in the plurality of target vectors.

9. The computer-implemented method of any of clauses 1-8, further comprising generating the machine learning model based on at least one of a configuration space associated with the set of joint parameters or a task space associated with the end-effector.

10. The computer-implemented method of any of clauses 1-9, wherein the machine learning model comprises a multi-layer perceptron.

11. In some embodiments, one or more non-transitory computer readable media include instructions that, when executed by one or more processors, cause the one or more processors to generate models that are used to solve inverse kinematic problems for object animations by performing the steps of generating a plurality of configuration vectors based on a set of joint parameters associated with a joint chain; executing one or more forward kinematic operations on the joint chain based on the plurality of configuration vectors to generate a plurality of target vectors, wherein each target vector included in the plurality of target vectors includes data associated with at least one of a position or an orientation for an end-effector associated with the joint chain; and performing one or more machine learning operations on a machine learning model based on the plurality of configuration vectors and the plurality of target vectors to generate a trained machine learning model that computes a predicted joint vector associated with the joint chain based on at least one of a target position or a target orientation for the end-effector.

12. The one or more non-transitory computer readable media of clause 11, wherein a first configuration vector included in the plurality of configuration vectors comprises a different value for each joint parameter included in the set of joint parameters.

13. The one or more non-transitory computer readable media of clauses 11 or 12, wherein generating a first configuration vector included in the plurality of configuration vectors comprises randomly or pseudo-randomly selecting a first value for a first joint parameter from a valid range of values for the first joint parameter.

14. The one or more non-transitory computer readable media of any of clauses 11-13, further comprising encoding at least one of a first target value for a first joint parameter that is included in the set of joint parameters, a first position for the end-effector, or a first orientation for the end-effector to generate a first target vector included in the plurality of target vectors.

15. The one or more non-transitory computer readable media of any of clauses 11-14, wherein the predicted joint vector comprises first data associated with a predicted set of values for a proper subset of the set of joint parameters.

16. The one or more non-transitory computer readable media of any of clauses 11-15, wherein performing the one or more machine learning operations comprises applying a loss function to a first configuration vector included in the plurality of configuration vectors and a first predicted joint vector computed via the machine learning model to determine a loss associated with the machine learning model.

17. The one or more non-transitory computer readable media of any of clauses 11-16, where performing the one or more machine learning operations comprises modifying at least one learnable parameter included in the machine learning model based on a first predicted joint vector computed via the machine learning model and a first configuration vector included in the plurality of configuration vectors.

18. The one or more non-transitory computer readable media of any of clauses 11-17, wherein a first joint parameter included in the set of joint parameters comprises a joint rotation parameter or a joint translation parameter.

19. The one or more non-transitory computer readable media of any of clauses 11-18, further comprising generating an inverse kinematic solver that performs one or more decoding operations on a first predicted joint vector computed via the trained machine learning model to compute a set of predicted values for the set of joint parameters or a proper subset of the set of joint parameters.

20. In some embodiments, a system comprises one or more memories storing instructions and one or more processors coupled to the one or more memories that, when executing the instructions, perform the steps of generating a plurality of configuration vectors based on a set of joint parameters associated with a joint chain; executing one or more forward kinematic operations on the joint chain based on the plurality of configuration vectors to generate a plurality of target vectors, wherein each target vector included in the plurality of target vectors includes data associated with at least one of a position or an orientation for an end-effector associated with the joint chain; and performing one or more machine learning operations on a machine learning model based on the plurality of configuration vectors and the plurality of target vectors to generate a trained machine learning model that computes a predicted joint vector associated with the joint chain based on at least one of a target position or a target orientation for the end-effector.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating models that are used to solve inverse kinematic problems for object animations, the method comprising:
    generating a plurality of configuration vectors based on a set of joint parameters associated with a joint chain including generating a first configuration vector included in the plurality of configuration vectors by randomly or pseudo-randomly selecting a first value for a first joint parameter from a valid range of values for the first joint parameter;
    executing one or more forward kinematic operations on the joint chain based on the plurality of configuration vectors to generate a plurality of target vectors, wherein each target vector included in the plurality of target vectors includes data associated with at least one of a position or an orientation for an end-effector associated with the joint chain; and
    performing one or more machine learning operations on a machine learning model based on the plurality of configuration vectors and the plurality of target vectors to generate a trained machine learning model that computes a predicted joint vector associated with the joint chain based on at least one of a target position or a target orientation for the end-effector.

2. The computer-implemented method of claim 1, wherein the first configuration vector included in the plurality of configuration vectors comprises a different value for each joint parameter included in the set of joint parameters.

3. The computer-implemented method of claim 1, further comprising removing a first value for a first joint parameter from a second configuration vector included in the plurality of configuration vectors to generate a first ground-truth joint vector, wherein the first joint parameter is included in the set of joint parameters and is designated as an input parameter of the machine learning model.

4. The computer-implemented method of claim 1, wherein the predicted joint vector comprises first data associated with a predicted set of values for the set of joint parameters.

5. The computer-implemented method of claim 1, wherein performing the one or more machine learning operations comprises executing the machine learning model on a first target vector included in the plurality of target vectors to generate a first predicted joint vector associated with the joint chain.

6. The computer-implemented method of claim 1, wherein performing the one or more machine learning operations comprises applying a loss function to the first configuration vector included in the plurality of configuration vectors and a first predicted joint vector computed via the machine learning model to determine a loss associated with the machine learning model.

7. The computer-implemented method of claim 1, wherein performing the one or more machine learning operations comprises modifying a first learnable parameter included in the machine learning model to reduce a loss associated with a first target vector included in the plurality of target vectors.

8. The computer-implemented method of claim 1, further comprising generating the machine learning model based on at least one of a configuration space associated with the set of joint parameters or a task space associated with the end-effector.

9. The computer-implemented method of claim 1, wherein the machine learning model comprises a multi-layer perceptron.

10. One or more non-transitory computer readable media including instructions that, when executed by one or more processors, cause the one or more processors to generate models that are used to solve inverse kinematic problems for object animations by performing the steps of:
    generating a plurality of configuration vectors based on a set of joint parameters associated with a joint chain including generating a first configuration vector included in the plurality of configuration vectors by randomly or pseudo-randomly selecting a first value for a first joint parameter from a valid range of values for the first joint parameter;

executing one or more forward kinematic operations on the joint chain based on the plurality of configuration vectors to generate a plurality of target vectors, wherein each target vector included in the plurality of target vectors includes data associated with at least one of a position or an orientation for an end-effector associated with the joint chain; and performing one or more machine learning operations on a machine learning model based on the plurality of configuration vectors and the plurality of target vectors to generate a trained machine learning model that computes a predicted joint vector associated with the joint chain based on at least one of a target position or a target orientation for the end-effector.

11. The one or more non-transitory computer readable media of claim 10, wherein the first configuration vector included in the plurality of configuration vectors comprises a different value for each joint parameter included in the set of joint parameters.

12. The one or more non-transitory computer readable media of claim 10, further comprising encoding at least one of a first target value for a first joint parameter that is included in the set of joint parameters, a first position for the end-effector, or a first orientation for the end-effector to generate a first target vector included in the plurality of target vectors.

13. The one or more non-transitory computer readable media of claim 10, wherein the predicted joint vector comprises first data associated with a predicted set of values for a proper subset of the set of joint parameters.

14. The one or more non-transitory computer readable media of claim 10, wherein performing the one or more machine learning operations comprises applying a loss function to the first configuration vector included in the plurality of configuration vectors and a first predicted joint vector computed via the machine learning model to determine a loss associated with the machine learning model.

15. The one or more non-transitory computer readable media of claim 10, where performing the one or more machine learning operations comprises modifying at least one learnable parameter included in the machine learning model based on a first predicted joint vector computed via the machine learning model and the first configuration vector included in the plurality of configuration vectors.

16. The one or more non-transitory computer readable media of claim 10, wherein a first joint parameter included in the set of joint parameters comprises a joint rotation parameter or a joint translation parameter.

17. The one or more non-transitory computer readable media of claim 10, further comprising generating an inverse kinematic solver that performs one or more decoding operations on a first predicted joint vector computed via the trained machine learning model to compute a set of predicted values for the set of joint parameters or a proper subset of the set of joint parameters.

18. A system comprising:
one or more memories storing instructions; and
one or more processors coupled to the one or more memories that, when executing the instructions, perform the steps of:
generating a plurality of configuration vectors based on a set of joint parameters associated with a joint chain including generating a first configuration vector included in the plurality of configuration vectors by randomly or pseudo-randomly selecting a first value for a first joint parameter from a valid range of values for the first joint parameter;
executing one or more forward kinematic operations on the joint chain based on the plurality of configuration vectors to generate a plurality of target vectors, wherein each target vector included in the plurality of target vectors includes data associated with at least one of a position or an orientation for an end-effector associated with the joint chain; and
performing one or more machine learning operations on a machine learning model based on the plurality of configuration vectors and the plurality of target vectors to generate a trained machine learning model that computes a predicted joint vector associated with the joint chain based on at least one of a target position or a target orientation for the end-effector.

\* \* \* \* \*